United States Patent [19]

Tashiro et al.

[11] Patent Number: 5,065,002

[45] Date of Patent: Nov. 12, 1991

[54] LABEL ISSUING APPARATUS

[75] Inventors: Takeshi Tashiro; Kazuhiro Fushimi; Kazuaki Sugimoto, all of Shizuoka, Japan

[73] Assignee: Tokyo Electric Company, Ltd., Tokyo, Japan

[21] Appl. No.: 578,534

[22] Filed: Sep. 7, 1990

[30] Foreign Application Priority Data

Sep. 8, 1989 [JP] Japan ............................ 1-234169

[51] Int. Cl.$^5$ .................................................. G06K 7/10
[52] U.S. Cl. ...................................... 235/472; 235/383; 235/385; 235/432
[58] Field of Search ............... 235/472, 383, 385, 454, 235/432; 346/76 PH

[56] References Cited

U.S. PATENT DOCUMENTS

| 3,701,318 | 10/1972 | Lozeau et al. | 101/336 |
| 4,180,204 | 12/1979 | Koenig et al. | 235/385 |
| 4,268,179 | 5/1981 | Long et al. | 346/76 PH |
| 4,415,065 | 11/1983 | Sandstedt | 235/383 |

FOREIGN PATENT DOCUMENTS

| 57-209571 | 12/1982 | Japan . | |
| 59-162079 | 9/1984 | Japan | 400/242 |
| 61-188172 | 8/1986 | Japan | 400/242 |
| 61-259938 | 11/1986 | Japan . | |
| 62-56178 | 3/1987 | Japan | 400/236 |

Primary Examiner—Harold Pitts
Attorney, Agent, or Firm—Oblon, Spivak, McClelland, Maier & Neustadt

[57] ABSTRACT

According to the present invention, there is provided a hand scanner having an optical reader portion for reading data optically, a memory portion for storing the data read by the optical reader portion, and a light emitting portion for outputting the data stored in the memory portion as a light signal, and also provided is a printer comprising, in a successively connected arrangement, a light receiving portion for receiving the light signal emitted from the light emitting portion of the hand scanner, an opto-electro transducer means for converting the light signal received by the light receiving portion into an electric signal, a printing control portion for controlling printing in accordance with the electric signal obtained by the opto-electro transducer means, and a printing portion for making printing on a label in accordance with the control made by the printing control portion. Thus, the transfer of data from the hand scanner to the printer is realized by such optical means.

10 Claims, 9 Drawing Sheets

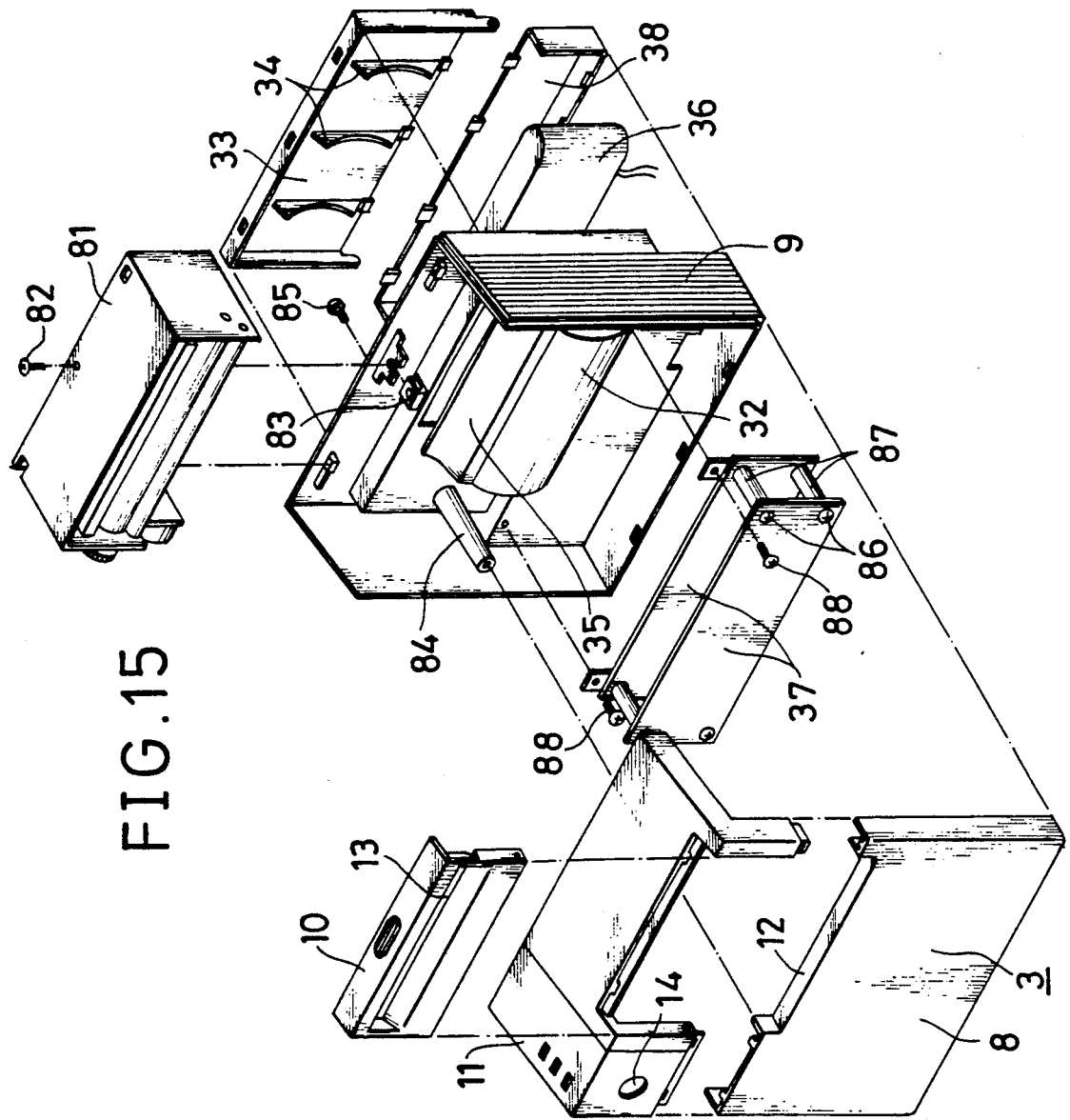

LABEL ISSUING APPARATUS

FIELD OF THE INVENTION AND RELATED ART STATEMENT

The present invention relates to a label issuing apparatus for printing predetermined matters on a label and issuing the printed label. Particularly, the present invention is concerned with a label issuing apparatus wherein data such as bar code is read optically using a hand scanner and the read data is transferred to a printer.

Heretofore there has been known a method whereby data such as bar code prepared by a host printer is transferred to another printer through a cable and a label is printed by the printer on the basis of the data thus transferred. Also, there has been known another method whereby a printer and a keyboard are interconnected through a cable and data which have been inputted by the keyboard are transferred to the printer, which in turn makes printing on a label on the basis of the data thus transferred.

According to such conventional methods, however, since data are transferred to the printer through a cable, the cable is an obstacle to operation in the case of carrying the printer during the use thereof and thus the operability is poor.

OBJECTS AND SUMMARY OF THE INVENTION

It is the first object of the present invention to provide a label issuing apparatus superior in operability.

It is the second object of the present invention to provide a label issuing apparatus capable of transferring data read by a hand scanner accurately to a printer.

It is the third object of the present invention to provide a label issuing apparatus capable of modifying data read by a hand scanner or adding additional data to the read data.

It is the fourth object of the present invention to provide a label issuing apparatus having a reduced number of components and easy to be assembled.

According to the present invention, in order to achieve the above-mentioned objects, there is provided a hand scanner having an optical reader portion for reading data optically, a memory portion for storing the data read by the optical reader portion, and a light emitting portion for outputting the data stored in the memory portion as a light signal, and also provided is a printer comprising, in a successively connected arrangement, a light receiving portion for receiving the light signal emitted by the light emitting portion of the hand scanner, an opto-electro transducer means for converting the light signal received by the light receiving portion into an electric signal, a printing control portion for controlling printing in accordance with the electric signal obtained by the opto-electro transducer means, and a printing portion for making printing on a label in accordance with the control made by the printing control portion. Data read by the hand scanner is stored in the memory portion, and then at the time of printing, it is read out of the memory portion to be outputted as a light signal from the light emitting portion and transferred to the printer. In an opposed positional relation between the light emitting portion of the hand scanner and the light receiving portion of the printer, the light signal from the light emitting portion is received by the light receiving portion. Thereafter, the light signal is converted into an electric signal by the opto-electro transducer means, and a printing control signal based on the electric signal is generated by the printing control section to control the operation of the printing portion, whereby the data read by the hand scanner is reproduced on a label. Thus, the transfer of data from the hand scanner to the printer is performed by an optical means, so it is possible to omit a cable for data transfer. Consequently, even in the case of using the apparatus while carrying the hand scanner and the printer, both are improved in operability.

BRIEF DESCRIPTION OF THE DRAWINGS

FIG. 15 is an exploded perspective view showing the structure of the printer body.

DESCRIPTION OF THE PREFERRED EMBODIMENT

Figure 1:
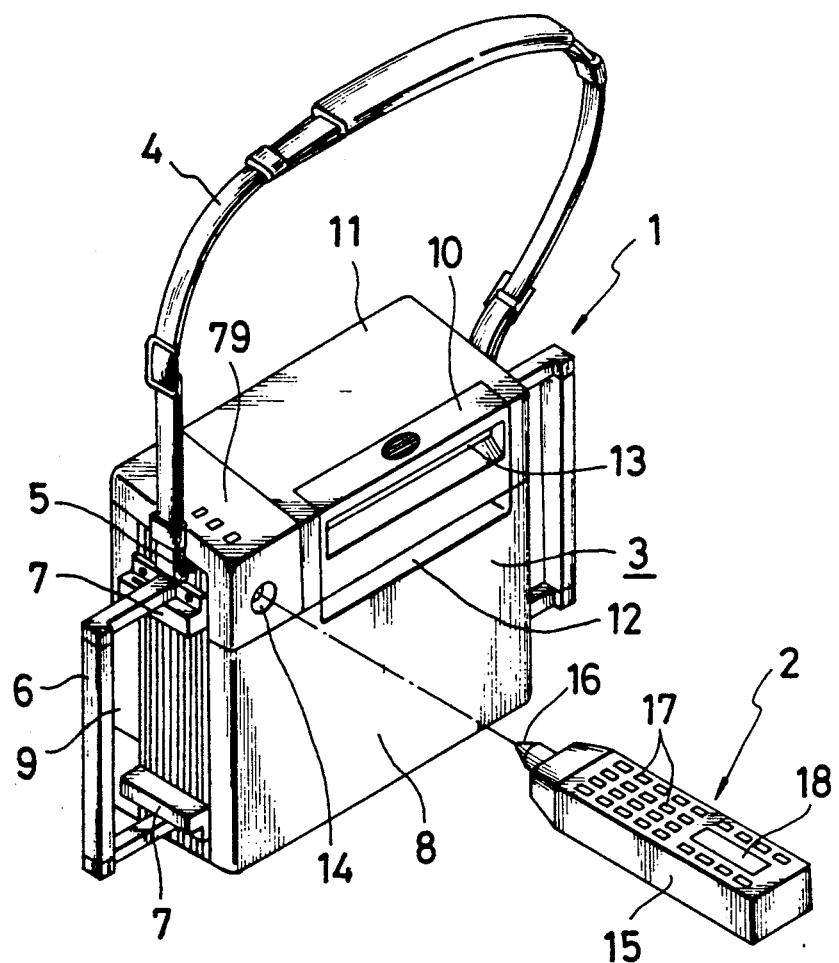
FIG. 1 is a perspective view of a printer and a hand scanner according to an embodiment of the present invention.

An embodiment of the present invention will be described hereinunder with reference to FIGS. 1 to 15. In FIG. 1 there is illustrated an entire appearance of a printer 1 and a hand scanner 2.

Figure 2:
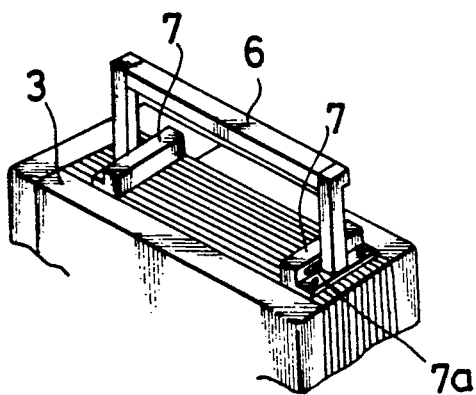
FIG. 2 is a perspective view of an upper portion of the printer, with a handle of the printer being in a raised state.
Figure 3:
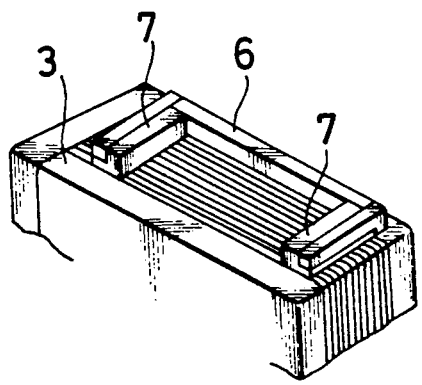
FIG. 3 is a perspective view of an upper portion of the printer, with the printer handle being in a folded state.

First, an external construction of a printer 1 will be described with reference to FIGS. 1 to 5. As shown in FIG. 1, a printer case 3 of the printer 1 is constituted as follows. A front cover 8 and a rear cover 9 opposed to each other are connected together, and a top cover 11 having a panel 10 fitted in the front face thereof removably is connected to the upper portions of the front and rear covers 8, 9. An upper edge of the front cover 8 is spaced from a lower edge of the panel 10 to form a paper discharge port 12 which is laterally long, and in the front face of the panel 10 is formed a label issuing port 13 which is laterally long. Further, a light receiving hole 14 is formed on one side of the front face of the top cover 11. The inner opening portion of the light receiving hole 14 is closed with a transparent plate 80 opposed to a later-described light receiving portion 73. The transparent plate 80 fulfills a dust- and water-proofing function and is formed flat separately from the top cover 11, so the transmission of light is uniform without refractive strain. On the other hand, a shoulder belt 4 whose length can be adjusted is attached to the upper side of the printer case 3, and handles 6 are attached to both sides of the printer case. More specifically, a retainer 5 for retaining the shoulder belt 4 removably and a pair of retainers 7 for retaining both ends of the handle 6 pivotably are fixed to each of both sides of the printer case 3. Further, as shown in FIG. 2, a slot 7a is formed in each retainer 7 in the thickness direction of the printer case 3, and pins (not shown) formed on both ends of the handle 6 are fitted in the slots 7a slidably and rotatably, whereby the handle 6 is mounted to the retainers 7. Therefore, as shown in FIG. 3, the handle 6 can be folded compactly by moving the pins of the handle 6 to ends of the slots 7a and then turning the handle 6 in the direction of contact with both sides of the printer case 3.

Figure 4:
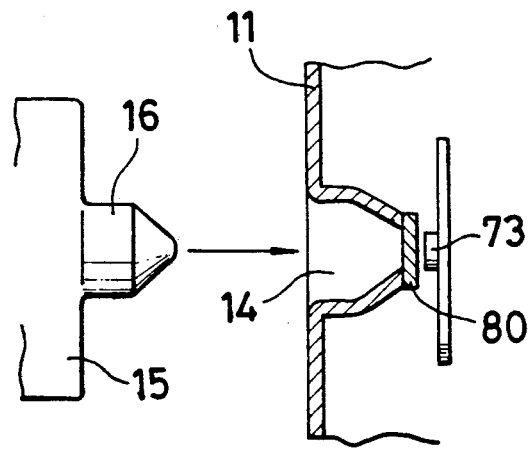
FIG. 4 is a side view in vertical section of a mounting portion of the hand scanner and the printer.
Figure 5:
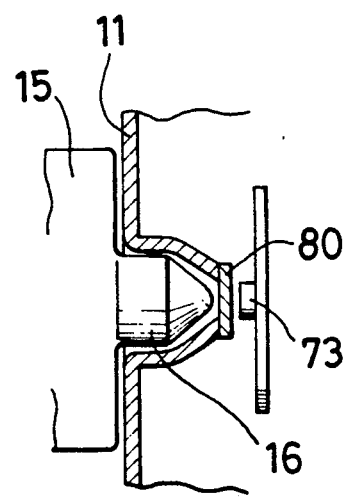
FIG. 5 is a side view in vertical section showing a mounted state of the hand scanner to the printer.
Figure 6:
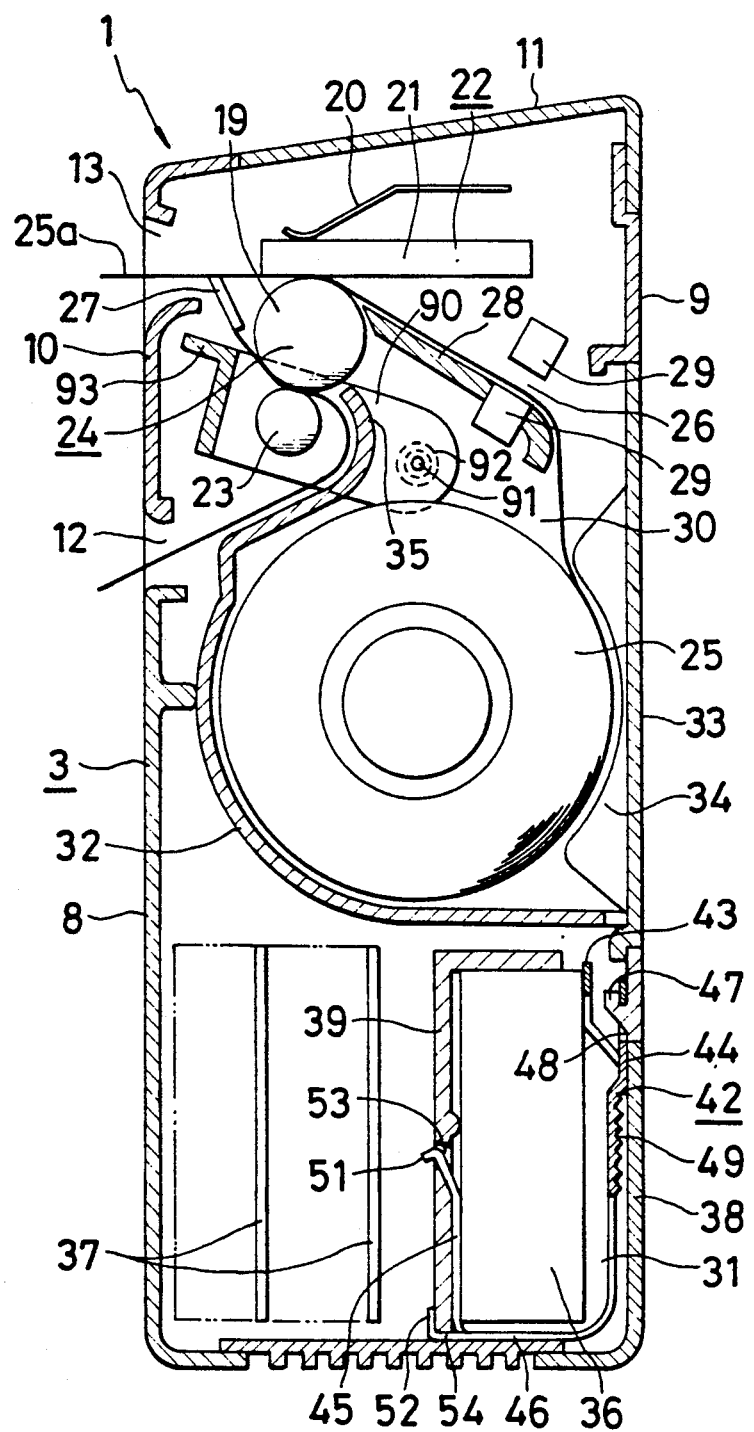
FIG. 6 is a side view in vertical section of the printer.

Now, an external construction of the hand scanner 2 will be described with reference to FIGS. 1, 4 and 5. The hand scanner 2 includes a scanner case 15, and a front end of the scanner case 15 is formed with a cylindrical portion 16 to be inserted into the light receiving hole 14 formed on the front left side of the top cover 11. On the upper surface of the scanner case 15 are arranged a keyboard 17 and a display 18.

An internal structure of the printer 1 will now be described with reference to FIGS. 6 to 12. For the convenience of explanation, the internal structure will be divided into upper, central and lower structures.

First, as an upper structure, a printing portion 22, a pasteboard feed portion 24, a paper passage 26 and a label separator 27 are disposed in the upper portion of the printer case 3.

Figure 7:
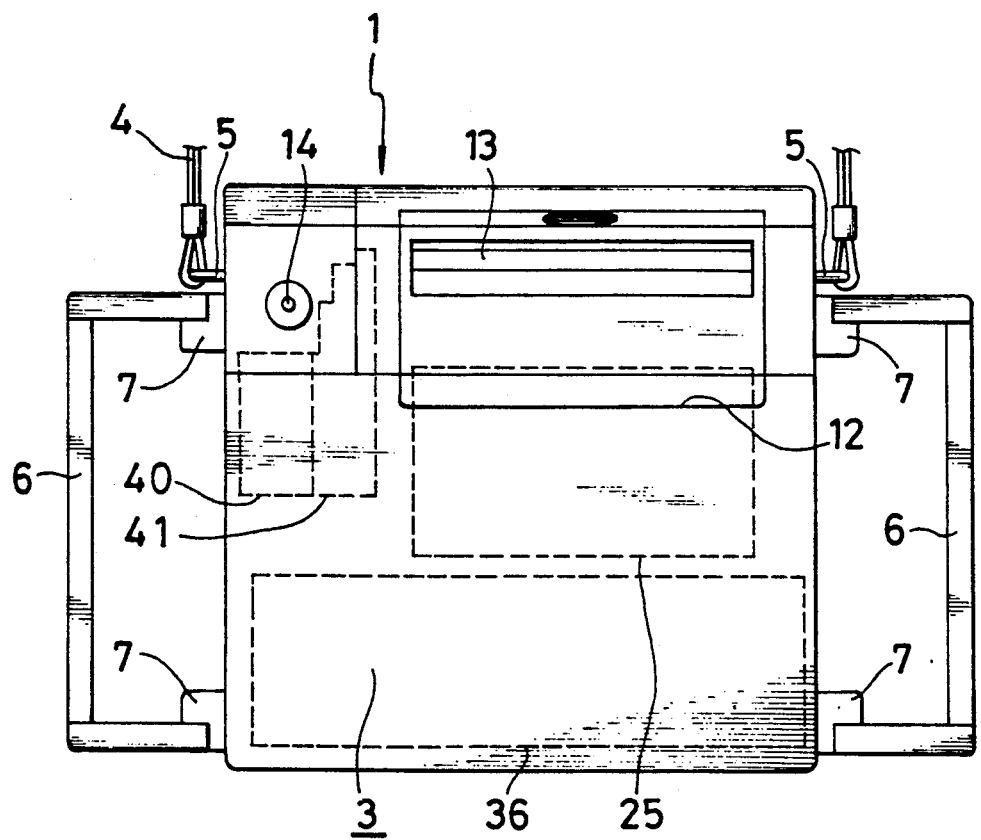
FIG. 7 is a front view of the printer.
Figure 8:
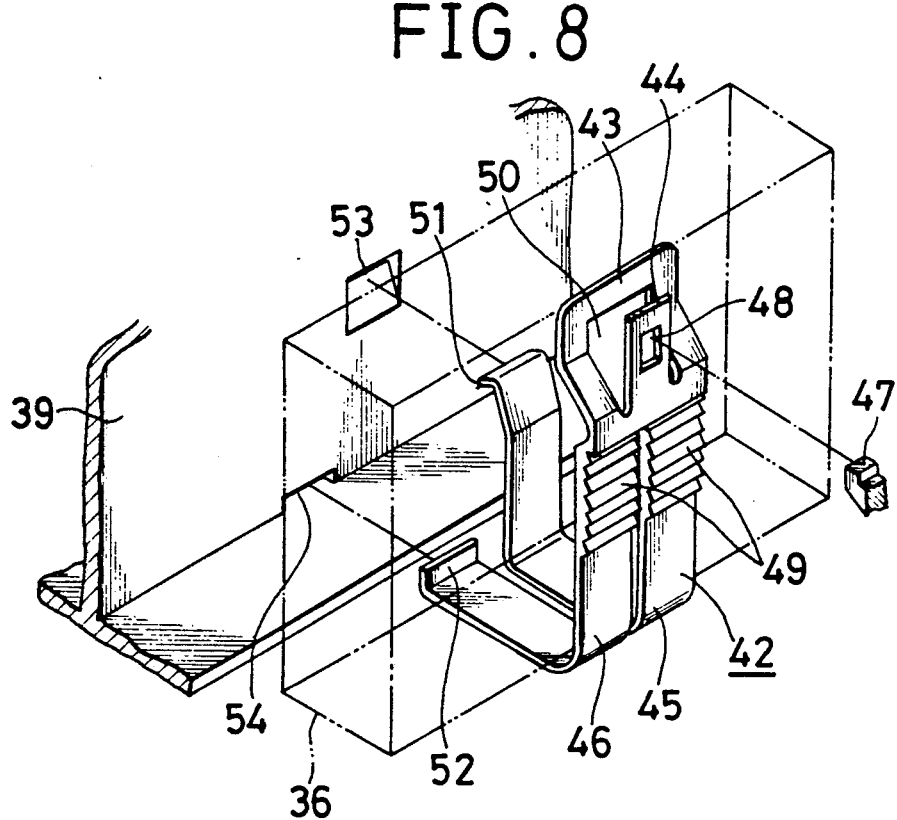
FIG. 8 is an exploded perspective view showing a mounted state of a band for fixing a battery.
Figure 9:
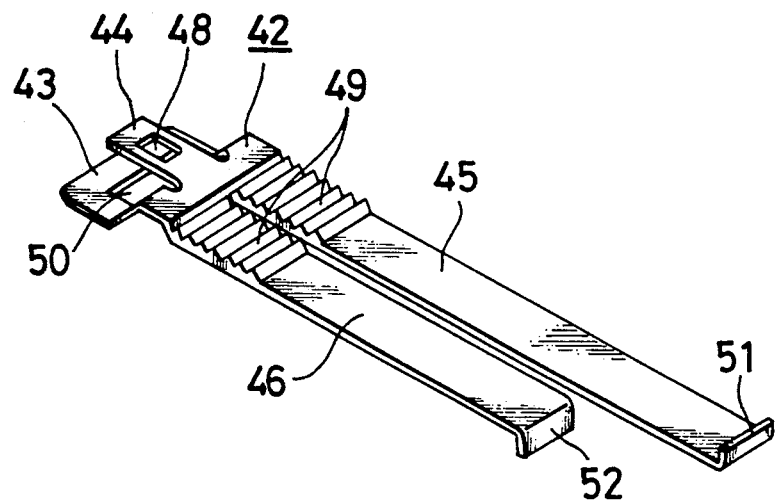
FIG. 9 is a perspective view of the band.
Figure 10:
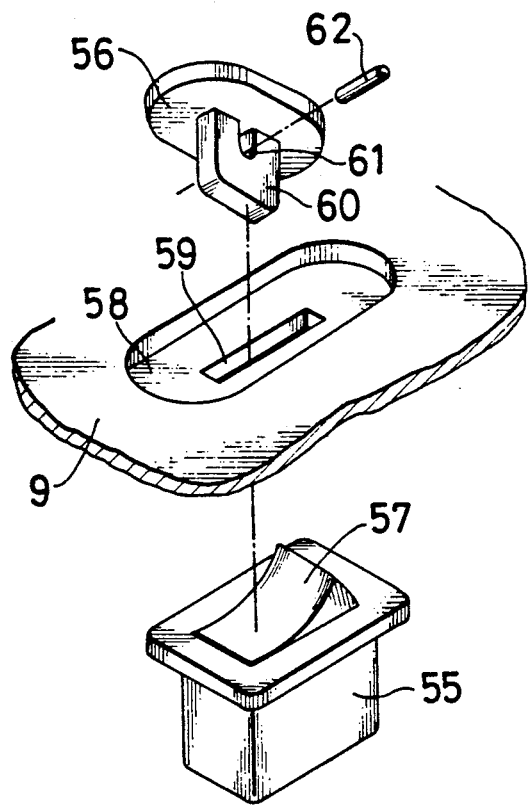
FIG. 10 is an exploded perspective view showing the structure of a power switch and a knob.
Figure 11:
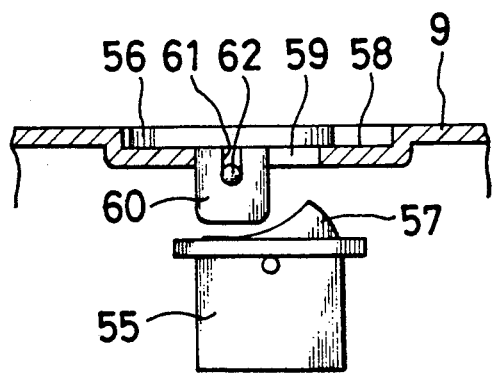
FIG. 11 is a side view in vertical section of the portion thereof.
Figure 12:
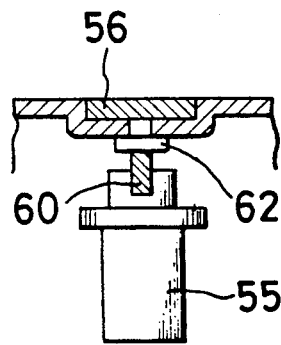
FIG. 12 is a front view in vertical section of the portion thereof.

The printing portion 22 comprises a platen 19, a pulse motor 40, gears 41 and a thermal head 21. The platen 19 is a cylindrical member mounted rotatably to the printer case 3, and the pulse motor 40 is connected to the platen 19 through the gears 41 to drive the plate 19. The thermal head 21 has a large number of heating elements (not shown) arranged on one line and is pushed against the platen 19 by means of a plate spring 20. As shown in FIG. 7, the pulse motor 40 and the gears 41 are retained on one side of the upper portion of the printer case 3.

The pasteboard feed portion 24 comprises the platen 19 and a pinch roller 23 which is in pressure contact with the platen 19 and is driven thereby. More specifically, the pinch roller 23 is mounted rotatably to a roller frame 90, and the roller frame 90 is mounted pivotably to the printer case 3 so that the pinch roller 23 comes into contact with and moves away from the platen 19 while maintaining its axial coincidence with the platen 19. Around a pivot shaft 91 serving as a pivotal center of the roller frame 90, there is wound in a twisted state a torsion spring 92 one end of which is fixed to the printer case 3 side and the other end fixed to the roller frame 90 side. By the torsional force of the torsion spring 92, the roller frame 90 is urged in the direction of pressure contact of the pinch roller 23 with the platen 19. The roller frame 90 is formed with a grip 93 positioned behind the panel 10.

The paper passage 26 is formed by a guide plate 28 for guiding along roll-like pasteboard with plural labels 25a stuck thereon at predetermined intervals to the position between the platen 19 and the thermal head 21. Near the inlet of the guide plate 28 there is disposed a transmission type sensor 29 for detecting the pasteboard optically. Either a light receiving element or a light emitting element of the sensor 29 is embedded in the guide plate 28.

The label separator 27, which is disposed inside the label issuing port 13, functions to bend the pasteboard 25 being pulled by the pasteboard feed portion 24, at an acute angle and thereby separate each label 25a from the pasteboard 25.

The central and lower structures of the printer 1 will now be described. In a middle portion of the printer case 3, there is formed a pasteboard receiving portion 30 for receiving the pasteboard 25 therein, and below the pasteboard receiving portion 30, there is formed a battery receptacle portion 31.

The pasteboard receiving portion 30 is formed in the space between a curved wall 32 formed integrally with a central part of the inner surface of the rear cover 9 and a plurality of arcuate ribs 34 formed on the inner surface of a paper cover 33 fitted in the rear cover 9 removably. A paper guide surface 35 inclined from the lower portion of the platen 19 toward the paper discharge port 12 is formed integrally with the upper portion of the curved wall 32.

A battery 36 of a long life type such as Ni-Cd and printed circuit boards 37 are held in the battery receptacle portion 231. More specifically, a battery cover 38 for opening an closing the battery receptacle portion 31 is fitted in the rear cover 9 removably, and a partition plate 39 which covers one side face and upper surface of the battery 36 is formed integrally in the battery receptacle portion 31. The battery 36 is held in the space formed between the battery cover 38 and the partition plate 39, and the printed circuit boards 37 are disposed in positions adjacent to the battery 36. A holding structure for the battery 36 will now be described with reference to FIGS. 8 and 9. First, a band 42 for holding the battery 36 is provided. The upper portion of the band 42 has a pressure-contact piece 43 which is brought into pressure contact with one face of the battery 36 and a pressure-contact piece 44 which is brought into pressure contact with the inner surface of the lower portion of the rear cover 9, while the lower portion of the band 42 has a plurality of legs 45 and 46 of different lengths. The band 42 is formed using a synthetic resin having both elasticity and flexibility such as nylon. An opening 50 is formed in one pressure-contact piece 43, while in the other pressure-contact piece 44 there is formed a retaining hole 48 for engagement with a lug 47 formed on the inner surface of the rear cover 9. The legs 45 and 46 are formed with concaves and convexes 49 positioned at middle portions and serving as slip resistance to human fingers, and also formed with pawls 51 and 52 which are bent at the front ends thereof. Further, the partition plate 39 of the battery receptacle portion 31 has retaining holes 53 and 54 for engagement with the pawls 51 and 52 of the legs 45, and 46, respectively.

Now, a weight distribution of the internal structure of the printer 1 will be explained. The pasteboard 25 is disposed centrally of the printer case 3, so even if its weight changes with consumption, this change will not cause a change in the weight distribution of the whole of the printer 1. The battery 36 has a weight of about 450 g and the printed circuit board 37 has a weight of about 150 g. Therefore, a weight of about 600 g is imposed on the lower portion of the printer 1. The printing portion 22, the pasteboard feed portion 24 and a mechanical portion such as the frame for holding the printing portion and the pasteboard feed portion have a weight of about 500 g, and the pulse motor 40 has a weight of about 100 g. Therefore, a weight of about 600 g is also imposed on the upper portion of the printer case 3. Such an entire weight distribution permits the printer 1 to be well balanced in weight both vertically and transversely.

Now, a mounting structure of a knob 56 for operating a power switch 55 of the printer 1 will be described. The power switch 55, which is mounted on the inner surface side of the rear cover 9 for example, is a seesaw type switch capable of assuming a highly reliable contact state in which a knob 57 is inverted with a neutral position as a boundary at the time of switching from one to the other contact. On the other hand, a recess 58 having a slit 59 in the bottom thereof is formed in the outer surface of the rear cover 9, and the knob 56 is mounted slidably within the recess 58. More specifically, the knob 56 is formed with a tongue piece 60 capable of being slidably fitted in the slit 59, with an elongated hole 61 being formed in the base portion of the tongue piece 60. The knob 56 is mounted slidably in the recess 58 by inserting the tongue piece 60 into the slit 59 and press-fitting a metallic pin 62 into the elongated hole 61 along the inner surface of the rear cover 9. Therefore, the switching operation of the power switch 55 is performed by sliding the knob 56 to press the knob 57 of the power switch 55. The knob 56 never projects from the outer surface of the rear cover 9 because the thickness thereof is a littler smaller than the depth of the recess 58, and hence even in the event of contact of a human body or any other portion with the outer surface of the rear cover 9, the knob 56 will never more. Further, since the pine 62 comes into a linear contact with the inner surface of the rear cover 9, the contact area thereof is small and so it is possible to reduce the operating force of the knob 56.

Figure 13:
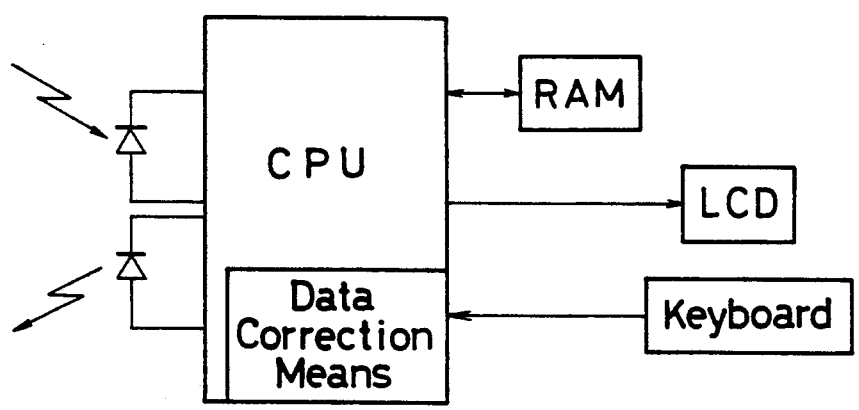
FIG. 13 is a block diagram showing an electronic circuit of the hand scanner.

Referring now to FIG. 13, there is illustrated an electronic circuit of the hand scanner 3. A CPU 66 is provided, to which are connected an RAM 63 as a memory portion, a reading element 64, a light emitting element 65, the keyboard 17 and the display 18. The CPU 66 and the reading element 64 constitute an optical reader portion 94 which reads data such as bar code, using an optical means. Further, the CPU 66 and the light emitting element 65 constitute a light emitting portion 95 which converts data stored in the RAM 63 into a light signal and outputs the latter. In the CPU 66, there is provided a data correcting means 96 for modifying or adding an additional data to the data stored in the RAM 63. On the display 18, there is displayed an image based on the data stored in the RAM 63. The RAM 63 and the CPU 66 are contained in the scanner case 15, while the reading element 64 and the light emitting element 65 are provided in the cylindrical portion 16 formed at the front end of the scanner case 15. And positioning is made so that when the cylindrical portion 16 is fitted in the light receiving hole 14 of the printer 1, the light emitting element 65 is opposed to the light receiving portion 73.

Figure 14:
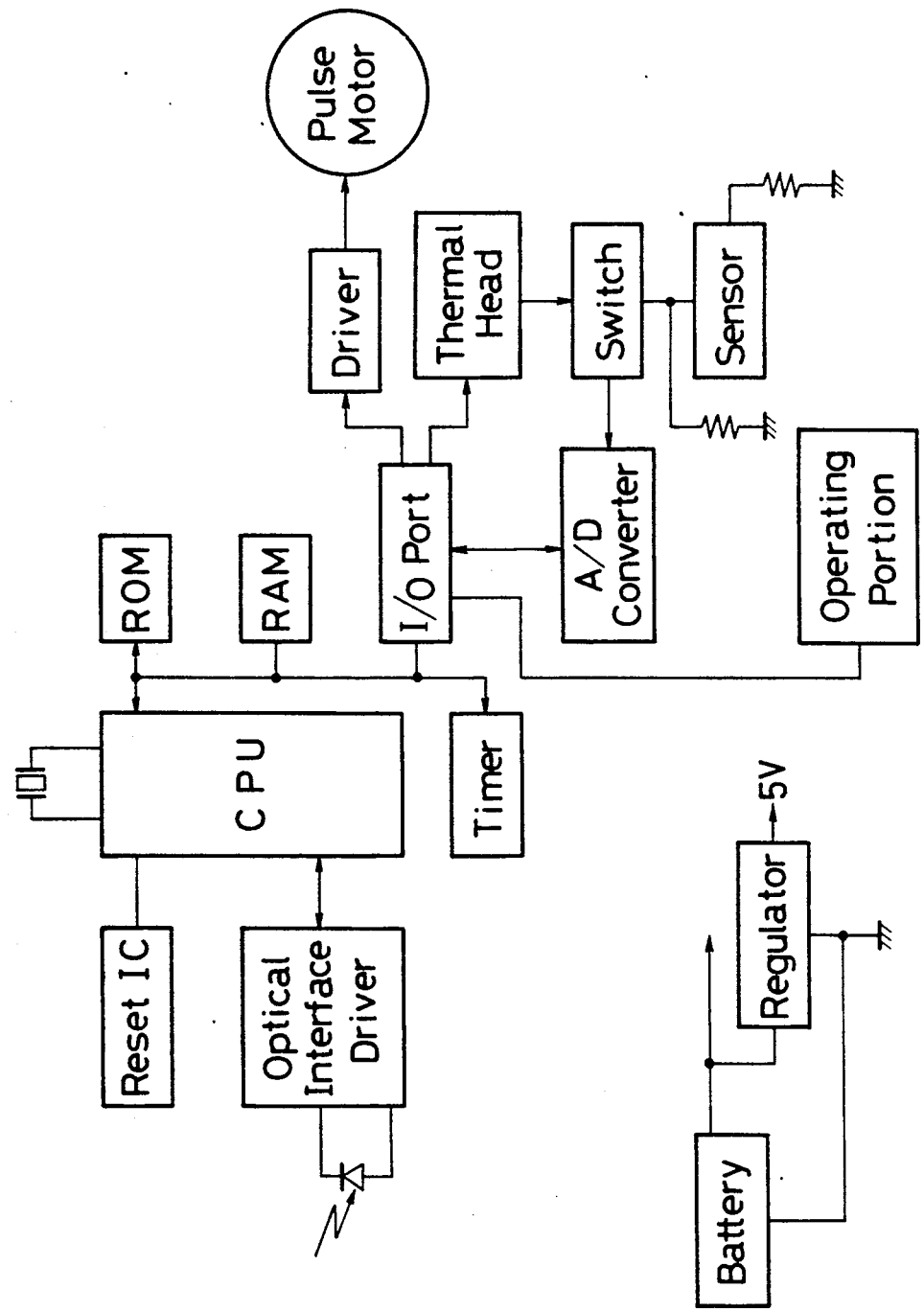
FIG. 14 is a block diagram showing an electronic circuit of the printer.

Referring now to FIG. 14, there is illustrated an electronic circuit of the printer 1. To a CPU 67a which makes a synthetic control for the printer 1, there are connected an ROM 68 with a program written therein, an RAM 69 in which are written variable data, a reset IC 70, an optical interface driver 71, a timer 72, and an I/0 port 74. To the I/0 port 74 are connected a driver 75 to which is connected the pulse motor 40; the thermal head 21; an analog-to digital converter 76 for selective analog-to-digital conversion of data at the temperature of the thermal head 21 and the output of the sensor 29 through a switch 78 to which are connected the thermal head 21 and the sensor 29; and an operating portion 79 which comprises the keyboard and LED for indicating various states of operation. Further, the output of the battery 36 is fed not only to the thermal head 21 and the driver 75 but also, after adjustment in a regulator 77, to such electronic components as the CPU 67a, ROM 68 and RAM 69. The optical interface driver 71 functions as an opto-electro transducer means which converts the light signal received by the light receiving portion 73 into an electric signal. The CPU 67a and the ROM 68 function as a printing control portion 67 which generates a printing control signal on the basis of the electric signal obtained by the opto-electro transducer means.

FIG. 15 is an exploded perspective view showing the structure of the printer case 3. As shown in this figure, a frame 81 is attached to the rear cover 9. The frame 81 is for holding the printing portion 22, pasteboard feed portion 24, label separator 27, pulse motor 40 and gears 41. Both sides of the frame 81 are partially brought into engagement with the rear cover 9, and a bolt 82 fitted in a central part of the upper surface of the frame 81 is brought into threaded engagement with a nut 83 fitted in the rear cover 9, whereby the frame 81 is fixed. Cylindrical rods 84 are integrally formed in both side positions of the inner surface of the rear cover 9, and bolts 85 fitted in the rods 84 are threadedly engaged with the front cover 8, whereby the front cover 8 and the rear cover 9 are connected together. Further, the two printed circuit boards 37 are integrally connected together into a unit through plural bolts 86 and pipes 87 and are fixed to the inner surface of the rear cover 9 with plural bolts 88.

For reading data such as bar code (not shown) using the hand scanner 2, the keyboard 17 of the hand scanner 2 is operated to select a reading mode, and the reading element 64 of the optical reading portion 94 is moved along the data, whereby the data is read by the optical reading portion 94 and is stored as an electric signal in the RAM 63.

Next, for printing the data thus read by the hand scanner 2 onto each label 25a by the printer 1, the power switch 55 of the printer 1 is turned on by operating the knob 56, while the light emitting element 65 of the hand scanner 2 is opposed to the light receiving portion 73 of the printer 1, and the operation mode is switched to a data transfer mode by operating the keyboard 17 of the hand scanner 2, followed by designation and access of data stored in the RAM 63. As a result, this data is outputted as a light signal from the light emitting element 65 of the light emitting portion 95 and is received by the light receiving portion 73 of the printer. In this way the transfer of data is performed using such light signal. The light signal received by the light receiving portion 73 is again converted into an electric signal by the optical interface driver 71, which signal is outputted as a printing signal to the thermal head 21 under control of the CPU 67a. On the other hand, the pasteboard 25 is pulled out from the pasteboard receiving portion 30 by the operation of the platen 19, and printing is made to each label 25a on the pasteboard 25 by the thermal head 21. The pasteboard 25 delivered from between the platen 19 and the thermal head 21 is pulled without looseness by the pasteboard feed portion 24 and bent at an acute angle at the portion of the label separator 27, so that the label 25a which has been printed is separated at this bent portion from the pasteboard 25 and is issued from the label issuing port 13. The portion of the pasteboard 25 from which the label 25a has been separated is guided along the pasteboard guide surface 35 and discharged from the paper discharge port 12. Through these operations, there is issued the label 25a on which has been printed an image based on the data such as bar code read by the hand scanner 2.

On the other hand, before the transfer of data from the hand scanner 2 to the printer 1, it is possible to modify the contents of data stored in the RAM 63 or add another data to the stored data, by operating the keyboard 17. The state of this data modification or addition can be seen on the display 18 of the hand scanner 2, so the operation for the modification or addition is easy. Modification or addition for the data stored in the RAM 63 is performed by a data correcting means 96 which is provided in the CPU 66 and performs a processing in accordance with a signal provided from the keyboard 17.

Thus, since the transfer of data from the hand scanner 2 to the printer 1 is performed using a light signal, it is no longer required to use a data transfer cable and the operability of the hand scanner 2 is thereby improved. Particularly, when the apparatus is used while carrying the printer 1 and the hand scanner 2, the operability of the latter two is improved remarkably.

The transfer of data is performed in a fitted state of the cylindrical portion 16 of the hand scanner 2 into the light receiving hole 14 of the printer 1. In this state, the light emitting element 65 and the light receiving portion 73 are opposed in close proximity to each other, so that an optical path is defined accurately to ensure the data transfer. Besides, the operator's hand can be kept away from the hand scanner 2 and hence the operability is improved. Since the inner opening portion of the light receiving hole 14 is closed with the transparent plate 80, there is attained a dust- and water-proofing effect. The data transfer may be carried out in an opposed state of the light emitting element 65 to the light receiving portion 73 of the printer 1 while gripping the hand scanner 2.

In the cylindrical portion 16 of the hand scanner 2, there are disposed the reading element 64 and the light emitting element 65 in positions opposed to each other. Therefore, in the case of printing out of data just after reading of the data by the hand scanner 2, it is not necessary to shift the hand scanner from one hand to the other at the time of change-over between reading and transfer of data, whereby the operability is improved.

Moreover, since the printer 1 has the shoulder belt 4 and the handles 6, it is possible to use the printer properly according to purposes. Thus, the printer 1 is superior in portability, and when a suitable table for mounting the printer 1 thereon is not found nearby, label issuing operation can be done easily with the shoulder belt 4 on the operator's shoulder. In this case, the handles 6 are provided on the side faces of the printer 1, while the shoulder belt 4 is provided above the upper side of the printer 1, so by disposing the operating portion 79 on the upper side of the printer the operating portion can be operated without being interrupted by the handles 6. Besides, in the interior of the printer 1, the pasteboard 25 which is wound up in the form of a roll is disposed in the central portion and functional components are disposed around the pasteboard, so that a uniform weight distribution is attained vertically and transversely. Consequently, the portability of the printer 1 is improved and the operability thereof is also improved when used while being carried. Although the pasteboard 25 wound up in the form of a roll becomes lighter with consumption thereof, since it is disposed centrally in the printer 1, the entire weight balance of the printer 1 is not lost and the operability thereof not deteriorated even with change in weight of the pasteboard 25 caused by consumption of the pasteboard.

Further, it is necessary to provide means for preventing the pasteboard 25 being discharged from the pasteboard feed portion 24 from coming into contact with the pasteboard 25 received in the pasteboard receiving portion 30. In this embodiment, the pasteboard 25 which has passed the pasteboard feed portion 24 is guided along the pasteboard guide surface 35 and is discharged smoothly without coming into contact with the pasteboard 25 received in the pasteboard receiving portion 30. Besides, since the pasteboard guide surface 35 for such smooth discharge of the pasteboard 25 is formed integrally with the curved surface 32 formed centrally on the rear cover 9, there can be attained both the decrease in the number of components and the improvement of the assembling work efficiency.

Additionally, the pressure-contact pieces 43 and 44 of the band 42 in the battery receptacle portion 31 try to move away from each other due to their elasticity, so that the pressure-contact piece 43 causes the battery 43 to come into pressure contact with a side face of the partition plate 39. Further, the shorter leg 46 is bent elastically by an external force and the resulting reaction force causes the battery 36 to come into pressure contact with the side and upper faces of the partition plate 39. Consequently, despite of large variations in the outside diameter in general, the battery 36 is fixed without vibration under elastic flexibility of the pressure-contact pieces 43, 44 and the leg 46. Replacement of the battery 36 is performed after removing the battery cover 38 from the rear cover 9. If in this state a finger is put on the concave-convex portion 49 and pressed toward the battery 36 while pushing the band 42 upwards, the retaining hole 48 of the pressure-contact piece 44 and the lug 47 of the rear cover 9 become disengaged from each other. At this time, if the upper portions of the pressure-contact pieces 43 and 44 are conducted to the outside of the battery receptacle portion 31, the leg 45 with the pawl 51 at one end thereof engaged with the retaining hole 53 of the partition plate 39 is stretched by its own elasticity and pushes out the battery 36 to the outside of the battery receptacle portion 31, so that the battery 36 can be taken out easily. Mounting of the battery 36 can be done easily by operations reverse to the battery taking-out operations.

What is claimed is:

1. A label issuing apparatus comprising:
   a hand scanner having an optical reader portion for reading data optically, a memory portion for storing the data read by said optical reader portion, and a light emitting portion for outputting the data stored in said memory portion as a light signal; and
   a printer comprising, in a successively connected arrangement, a light receiving portion for receiving the light signal emitted from said light emitting portion of said hand scanner, an opto-electro transducer means for converting the light signal received by said light receiving portion into an electric signal, a printing control portion for controlling printing in accordance with the electric signal obtained by said opto-electro transducer means, and a printing portion for making printing on a label in accordance with the control made by said printing control portion.

2. A label issuing apparatus according to claim 1, wherein an elongated pasteboard wound up in the form of a roll is provided as a label pasteboard and is positioned in a central part of the interior of said printer, and functional components of said printer are disposed around said pasteboard inside said printer.

3. A label issuing apparatus according to claim 2, wherein said functional components are disposed in such positions as to attain a uniform weight distribution of said printer vertically and transversely.

4. A label issuing apparatus according to claim 1, wherein a shoulder belt and a handle are provided on different sides of said printer.

5. A label issuing apparatus according to claim 1, wherein said light emitting portion has a light emitting element disposed in the front end portion of said hand scanner, while said printer has a light receiving hole for fitting therein of the front end portion of the hand scanner removably, and said light receiving portion is disposed inside said light receiving hole.

6. A label issuing apparatus according to claim 5, wherein said light receiving hole is closed hermetically with a transparent plate.

7. A label issuing apparatus according to claim 1, wherein a reading element of said optical reader portion and a light emitting element of said light emitting portion are disposed in a front end portion of said hand scanner in positions adjacent to each other.

8. A label issuing apparatus according to claim 1, wherein said hand scanner is provided with a keyboard and a data correcting means for modifying the data stored in said memory portion or adding an additional data thereto in accordance with data inputted from said keyboard.

9. A label issuing apparatus according to claim 8, wherein said hand scanner is further provided with a display for displaying the data stored in said memory portion.

10. A label issuing apparatus according to claim 1, wherein an elongated pasteboard wound up in the form of a roll is provided; a pasteboard receiving portion for holding said pasteboard rotatably is provided in the interior of said printer; a pasteboard feed portion for the conveyance of said pasteboard is disposed between said pasteboard receiving portion and said printing portion; a label separator for separating each label from the pasteboard is disposed between said pasteboard feed portion and said printing portion; and a pasteboard guide surface extending from said pasteboard feed portion to a paper discharge port of said printer is formed integrally with the wall surface of said pasteboard receiving portion.

* * * * *